United States Patent [19]
Greve

[11] Patent Number: 5,286,326
[45] Date of Patent: Feb. 15, 1994

[54] METHOD FOR BINDING FIBERS IN A FIBER REINFORCED PREFORM USING AN ELECTROMAGNETIC FIELD TO MELT BINDING FIBERS

[75] Inventor: Bruce N. Greve, Davisburg, Mich.

[73] Assignee: The Budd Company, Troy, Mich.

[21] Appl. No.: 881,851

[22] Filed: May 12, 1992

[51] Int. Cl.⁵ .................. B32B 31/04; D21F 11/02; B27N 3/10
[52] U.S. Cl. .................... 156/272.4; 156/273.3; 156/285; 156/296; 156/272.2; 162/116; 162/138; 162/141; 162/146; 162/221; 265/257
[58] Field of Search ............... 162/116, 138, 141, 146, 162/221; 156/272.2, 272.4, 273.3, 285, 296; 428/283, 542.8; 116/DIG. 1; 264/257

[56] References Cited

U.S. PATENT DOCUMENTS

| | | |
|---|---|---|
| 1,676,798 | 7/1928 | O'Brien . |
| 2,393,541 | 1/1946 | Kohler . |
| 2,962,762 | 12/1960 | Hartmann et al. . |
| 3,014,835 | 12/1961 | Feigley, Jr. et al. . |
| 3,325,349 | 6/1967 | Reifers . |
| 3,442,757 | 5/1969 | Williams . |
| 3,449,207 | 6/1969 | Modersohn . |
| 3,612,803 | 10/1971 | Klaas .................. 156/272.4 |
| 4,162,935 | 7/1979 | Kollmann et al. . |
| 4,204,907 | 5/1980 | Korklan et al. . |
| 4,444,806 | 4/1984 | Morgan et al. .............. 156/272.2 |
| 4,647,415 | 3/1987 | Schafft . |
| 4,740,346 | 4/1988 | Freeman . |
| 4,775,705 | 10/1988 | Parker et al. . |
| 4,812,283 | 3/1989 | Farley et al. . |
| 4,818,448 | 4/1989 | Wrenn, Jr. et al. . |
| 4,849,147 | 7/1989 | Freeman . |
| 4,863,771 | 9/1989 | Freeman . |
| 5,039,465 | 8/1991 | Freeman et al. . |

FOREIGN PATENT DOCUMENTS 587989 12/1959 Canada .

OTHER PUBLICATIONS

Jack K. Rogers, "Structural Composites: Moving the Dream Closer to Reality", Plastics Technology, Sep. 1989, pp. 108–117.

"Man-Made Fibers, Manufacture", Encyclopedia of Polymer Science and Technology, vol. 8, John Wiley and Sons, 1968, pp. 374–404.

"Manufactured Fiber", McGraw Hill Encyclopedia of Science and Technology, vol. 10, 6th Edition, 1987, pp. 375–380.

J. A. Keown and R. W. Curtis, "Wet Slurry Proces Brings Precision To Reinforced Plastics".

*Primary Examiner*—George F. Lesmes
*Assistant Examiner*—James D. Withers
*Attorney, Agent, or Firm*—Harness, Dickey & Pierce

[57] ABSTRACT

A method and apparatus for binding the fibers of a fiber reinforced plastic preform. A fiber reinforced plastic preform is created in a preselected geometry from a mixture of reinforcing fibers and binding fibers, the binding fibers being responsive to a high frequency electromagnetic field to melt thereby binding the reinforcing fibers. The fiber reinforced plastic preform is then exposed for a short period of time to a high frequency electromagnetic field, with the high frequency electromagnetic field causing the binding fibers to melt thus binding the reinforcing fibers of the preform.

14 Claims, 2 Drawing Sheets

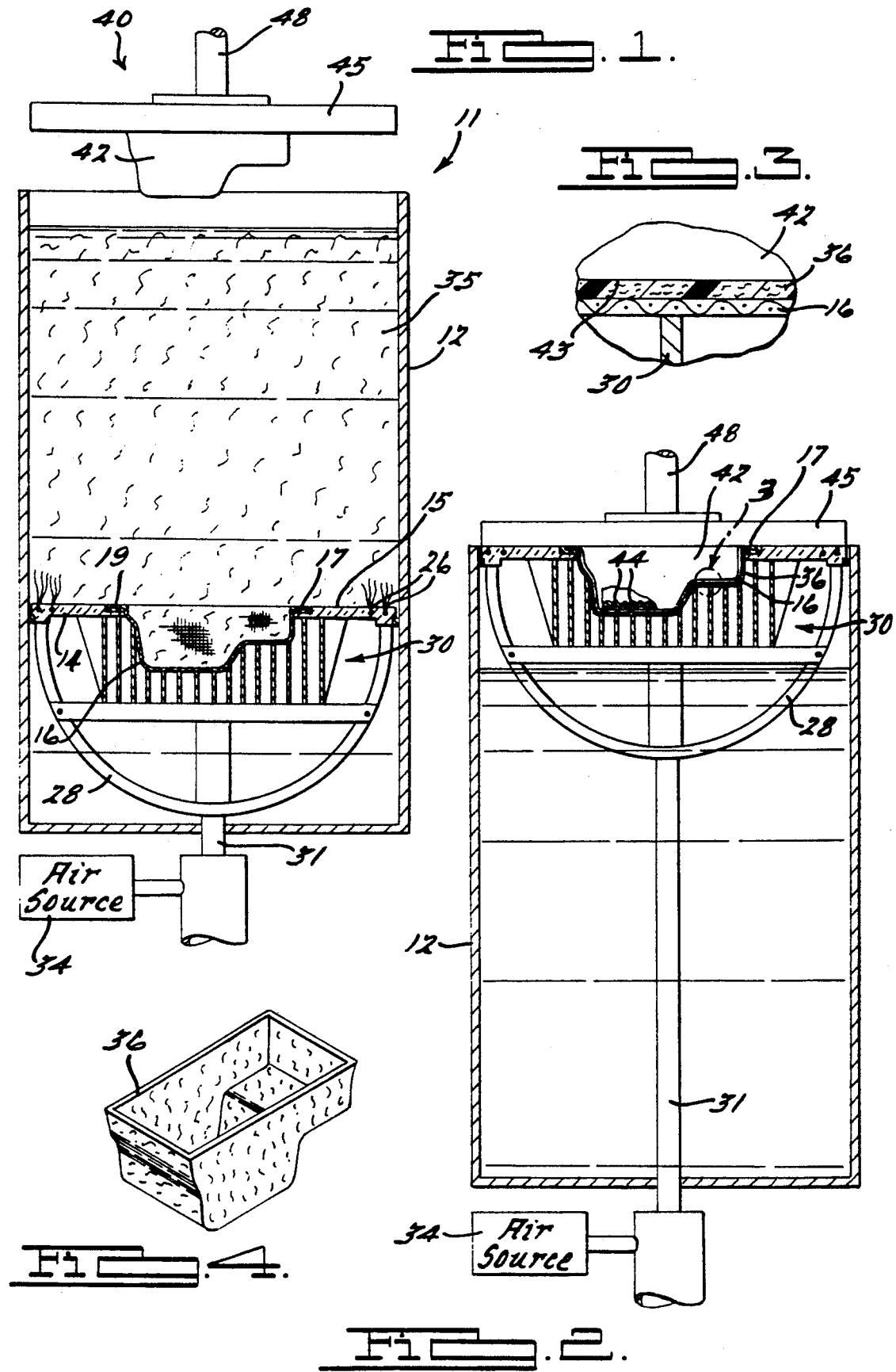

METHOD FOR BINDING FIBERS IN A FIBER REINFORCED PREFORM USING AN ELECTROMAGNETIC FIELD TO MELT BINDING FIBERS

BACKGROUND OF THE INVENTION

The present invention relates generally to forming fiber reinforced plastic preforms and, more particularly, to a method and apparatus for binding the fibers of a fiber reinforced plastic preform.

Fiber reinforced plastic (FRP) parts or composite parts are well known and used in a wide variety of applications. An FRP part generally consists of a plastic shape in which carbon, fiberglass, or other reinforcing fibers are dispersed in order to provide strength to the plastic. One method of making an FRP part is known as resin transfer molding (RTM). In RTM, fibrous material in a mold is injected with resin which cures to form the part. Examples of these techniques are disclosed in commonly assigned U.S. Pat. Nos. 4,740,346; 4,849,147; and 4,863,771, which are hereby incorporated by reference. In RTM, fibrous material is often formed into a preliminary shape before being placed into the mold. The shaped sections generally conform to the shape of adjacent mold die surfaces and are known as preforms. Preforms have been made in several different manners. One approach is to direct chopped fibers by means of a flow of air onto a screen. One problem with this technique is that it is difficult to obtain desired fiber orientation. Another method is to make the preforms from mats of fibrous material. This method however results in undesirable amounts of scrap and is labor intensive thus resulting in production cost inefficiencies. Still another technique known as a wet slurry process is disclosed, for example, in Keown et al., "Wet Slurry Process Brings Precision To Reinforced Plastics". As discussed therein, a slurry containing chopped glass strands or fibers is sucked by vacuum into a chamber covered by a screen. As a result the fibers are deposited on the screen. This approach, however, also has some drawbacks. For example, it is somewhat difficult to consistently obtain the desired fiber orientation and compactness or density of the fibers using this equipment. In addition, the pumps and other equipment required to create the vacuum and suck the slurry through the screen may be unduly complex and difficult to maintain. Furthermore, the process is relatively slow. An improved wet slurry process is disclosed in commonly assigned U.S. Pat. No. 5,039,465, which is also hereby incorporated by reference. The process disclosed therein teaches drawing the slurry through the screen by raising the screen through a tank containing a slurry of fibers resulting in the fibers being deposited on the screen. Further disclosed are unique configurations for the holes in the screen to direct the fibers into desired orientations.

Of concern in any preform forming process is handling the fiber preform without disturbing the shape of the preform or the orientation of the fibers. To this end, it is known that a binding material may be deposited along with the fibers when forming the preform. The binding material gives the preform sufficient strength to allow for handling without disturbing its shape or the orientation of the fibers. In typical applications, the binding material is a thermoplastic fiber mixed into the slurry with the reinforcing fibers as in a wet slurry process or blown along with the reinforcing fibers as in an air blown process onto the screen. After the preform is shaped, the preform, still on the screen, is placed into an oven where it is heated thus melting the thermoplastic fibers and binding the reinforcing fibers. Once cooled, the preform can be removed from the screen and handled without damaging it. However, this heating and cooling process, often taking several hours, is not well suited for mass production in that it requires the use of many screens, large ovens, and is very time consuming.

SUMMARY OF THE INVENTION

Pursuant to the present invention an efficient, low cost method and apparatus for binding the fibers in a fiber reinforced preform is provided. In the method, a screen shaped to the desired preform configuration is placed on a frame at the bottom of a water filled tank. Chopped reinforcing and binding fibers are then added to the water to create a slurry. The frame and screen are then raised to the top of the tank causing the fibers to be deposited on the screen in the shape of the preform. A high frequency electromagnetic field is introduced for a very short period of time, typically several seconds, thus melting the binding fibers and binding the reinforcing fibers of the preform. The preform then can be readily removed from the screen and handled without concern for damaging it.

In the preferred embodiment a fiber consisting of a thermoplastic matrix and a filler material having ferromagnetic properties is used as the binder material. The ferromagnetic material within the fibers acts to produce heat when exposed to an electromagnetic field thus melting the thermoplastic matrix material resulting in a fiber reinforced plastic preform consisting of reinforcing fibers bound together by thermoplastic fibers having ferromagnetic properties.

BRIEF DESCRIPTION OF THE DRAWINGS

The various advantages of the present invention will become apparent to one skilled in the art after reading the following specification and by reference to the drawings in which:

FIG. 1 is a front cross-sectional view taken along the lines 1—1 of FIG. 3 of a fiber reinforced plastic preform forming apparatus of the present invention with the screen positioned at the bottom of the tank;

FIG. 2 is a view of a fiber reinforced plastic preform forming apparatus of the present invention after the screen has been raised to the top of the tank and the electromagnetic field generator is moved into close proximity to the fiber reinforced plastic preform;

FIG. 3 is an enlarged partial cross-sectional view of the apparatus showing the electromagnetic field generator in contact with and compressing the fibers of the fiber reinforced plastic preform as deposited on the contoured screen;

FIG. 4 is a perspective view of a fiber reinforced plastic preform of the present invention;

DESCRIPTION OF THE PREFERRED EMBODIMENT

Figure 7:
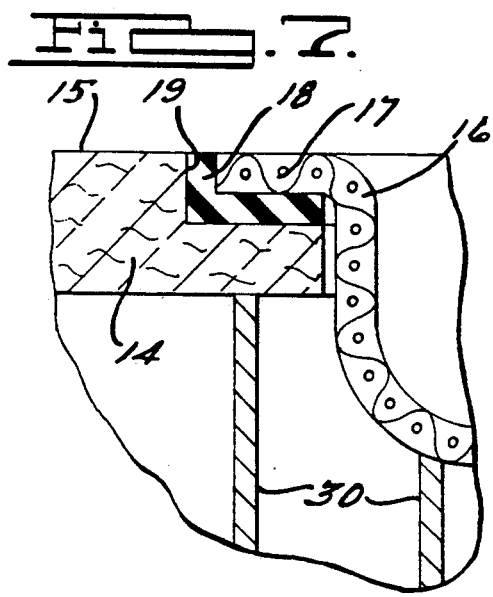
FIG. 7 is an enlarged partial cross-sectional view of the apparatus showing the screen mounting into a mask and matrix subframe.

It should be understood from the outset that the scope of the present invention need not be limited to the particular example used in connection with this invention since those skilled in the art will appreciate that its teachings can be used in a wide variety of applications. With this caveat in mind, the present invention will be described for exemplary purposes embodied in a wet slurry process an example of which is disclosed in the aforementioned commonly assigned U.S. Pat. No. 5,039,465. With reference then to FIGS. 1 and 7, a contoured screen 16 having a defined geometry and containing openings of a preselected pattern has been placed in an aperture 19 formed in the surface of mask 14. The inner portion of mask 14 defining aperture 19 is provided with an offset or rabbetted surface 21 allowing seal 18 and a radially extending lip 17 of screen 16 to fit flush to planar surface 15 of mask 14. Mask 14 and screen 16 are shown supported by frame member 28 and matrix subframe 30. The subframe 30 is a grid of vertically extending the metal bars and horizontally extending cross members. The top portion of matrix subframe 30 is suitably contoured to substantially match the contoured shape of screen 16 and thereby providing support over the entire surface area of screen 16. The bottom portion of subframe 30 is in contact with and suitably connected to frame member 28 thereby receiving support. As can best be seen in FIG. 5, matrix subframe 30 defines a plurality of openings 31 for allowing liquid passing through contoured screen 16 to further pass substantially unobstructed through matrix subframe 30.

As shown in FIG. 1, contoured screen 16 is initially positioned at the bottom of tank 12. Tank 12 is then filled with water and chopped reinforcing fibers such as glass, graphite, polyester or other suitable reinforcing fibers are added to create a slurry 35. Typically, the reinforcing fibers will be in bundles having approximately 500 filaments and a diameter of 2.5 to 25 microns with the bundles cut into one half to six inch lengths. Further added to slurry 35 are the binding fibers 50 of the present invention. Preferably, the binding fibers comprise approximately about 3-10 and, preferably, 6 percent by weight of the total weight of the fibers added to create slurry 35.

Figure 8:
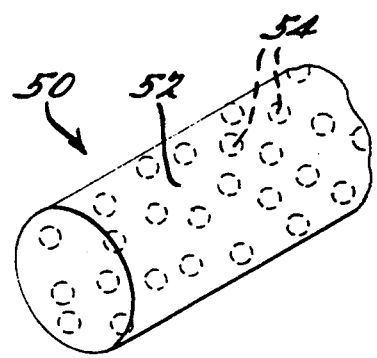
FIG. 8 is a perspective view of a binder fiber made in accordance with the teachings of the present invention showing a matrix material with a dispersion of ferromagnetic particles.

An exemplary embodiment of the binding fiber 50 of the present invention is shown in FIG. 8 as a matrix 52 of thermoplastic material having therein dispersed a quantity of filler material 54 having ferromagnetic properties. The matrix material 52 may be any of the thermoplastic materials, such as thermoplastic polyester, polypropylene, polyethylene, or nylon, suitable for forming into fibers. The filler material may be any ferromagnetic material which may be made into small particles to be dispersed into the thermoplastic matrix. Several types of suitable ferromagnetic materials are discussed in U.S. Pat. No. 2,393,541 (hereby incorporated by reference) and include iron, nickel, cobalt and their respective ferromagnetic alloys and oxides. In the preferred embodiment, the fiber 50 would consist of a thermoplastic polyester material with a 5-20 percent by weight dispersion of iron oxide particles having an irregular spherical shape approximately about 0.5-5 microns in diameter. When exposed to a high frequency electromagnetic field, the filler material 54 produces heat which then melts the thermoplastic material 52 binding the reinforcing fibers of the fiber preform in place. The fibers 50 can be made by melting a mass of thermoplastic material, adding thereto a mass of ferromagnetic material, molding them to create a homogenous mixture, extruding the mixture through a spinnerette or other suitable device and spinning or drawing to a predetermined diameter. The fiber may then be cut to length. In the present invention, the fiber is preferably 25-50 microns in diameter and cut approximately about 0.25-1.25 inch lengths.

Figure 5:
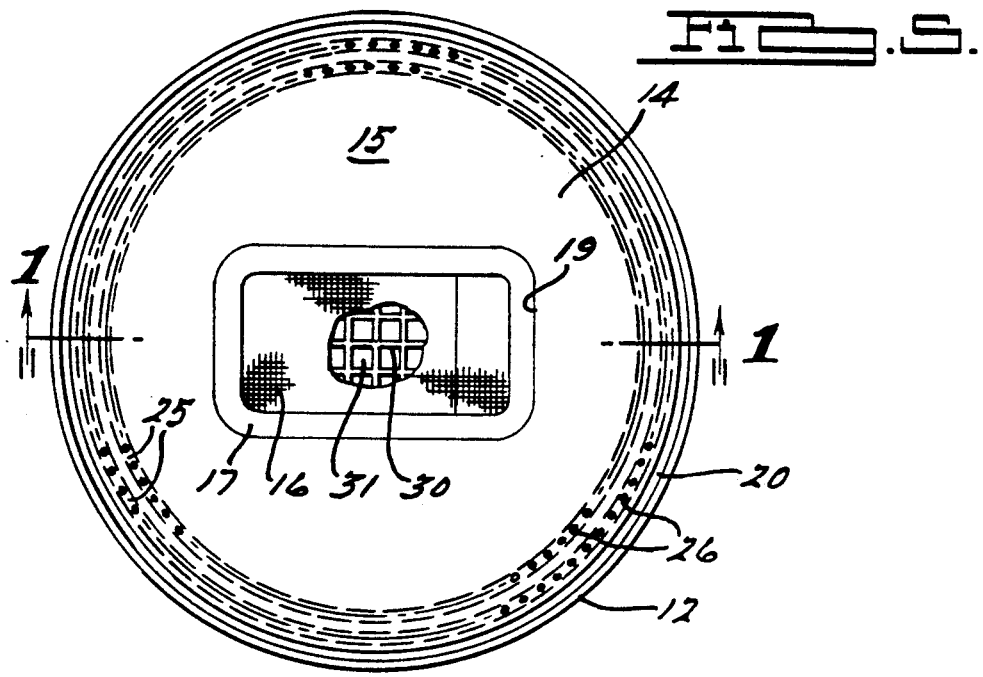
FIG. 5 is a top view of the apparatus partially broken away to further illustrate the matrix subframe structure.

With reference once again to FIGS. 1 and 2, contoured screen 16, mask 14 and frame 28 are raised to the top of tank 12 by activating a piston 31 attached to frame 28. In raising screen 16 to the top of tank 12 it is desirable to raise screen 16 quickly enough to create a partial vacuum on the underside of screen 16. This partial vacuum accompanied with the atmospheric pressure bearing down on the portion of slurry 35 above screen 16 cause the flow of slurry 35 through contoured screen 16 and the deposition of fibers onto the screen. The slurry is prevented from passing between mask 14 and walls of tank 12 by seal 20. This pressure differential, however, is equalized when any portion of mask 14 or screen 16 breaks the surface of slurry 35 thereby stopping the flow of slurry 35 through screen 16. It is therefore advantageous to maintain screen 16 below the surface of slurry 35 as long as possible. As can be seen in FIGS. 2 and 5, planar surface 15 of mask 14 is shown extending from the outer walls of tank 12 inwardly to aperture 19. Thus planar surface 15 of mask 14 allows for the pressure differential to be maintained for the maximum period of time by substantially maintaining all portions of screen 16 and mask 14 below the surface of slurry 35 until screen 16 reaches the top of tank 12. In raising screen 16 to the top of the tank, planar surface 15 further advantageously provides a smooth, unobstructed surface over which substantially all of the fibers of slurry 35 may be swept into contoured screen 16. Another advantage of mask 14 and planar surface 15 is demonstrated by the provision for mixing the reinforcing fibers.

Figure 6:
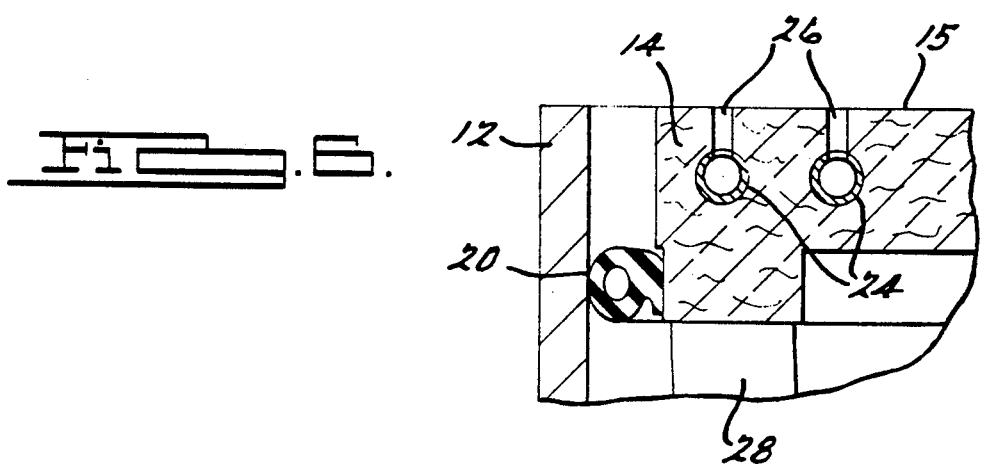
FIG. 6 is an enlarged partial cross-sectional view of the apparatus showing the seal and bubbler apparatus in particular detail.

As can be seen in FIGS. 6 and 5, embedded in mask 14 below planar surface 15 is a plurality of bubbler tubes 24 connected to the surface of mask 14 by a plurality of apertures 26 formed in mask 14. Air is advantageously conducted to bubbler tubes 24 from an air source 34 through hollow piston rod 31 and suitable connections to conduct air from hollow piston rod 31 to bubbler tubes 24. Air provided to bubbler tubes 24 is then conducted into tank 12 via apertures 26. In this manner slurry 35 is agitated directly above planar surface 15 thus assuring an even distribution of the reinforcing and binding fibers in slurry 35 and further improving the flow of slurry 35 over planar surface 15 to contoured screen 16.

FIGS. 2 and 3 show the present apparatus in its finished position. Once raised to the top of tank 12 the reinforcing fibers and binding fibers of slurry 35 are deposited on contoured screen 16 in the desired preformed shape 36. High frequency electromagnetic field generator 40 is then lowered into close proximity with fiber preform 36. In the preferred embodiment high frequency electromagnetic field generator 40 has a contoured plug 42 of substantially the same shape as preform 36 mounted to a base 45. Embedded near the surface 43 of plug 42 are a plurality of electromagnetic induction coils 44. Thus, when lowered under the action of piston 48, plug 42 slightly compacts the fibers of preform 36 as a high frequency electromagnetic field is generated thereby melting the thermoplastic binding fibers and binding the reinforcing fibers of preform 36. In the present invention, the high frequency electromagnetic field is generated by a suitable control source (not shown) in the range of 2 KHz to 2 MHz with a typical application consisting of 1 MHz field active for approximately about 2–15, and preferably about 5 seconds.

While all of the theoretical technical details of the binding action of the present invention are not completely understood, it is believed that the heating of the binding fibers 50 by the electromagnetic field raises the temperature in the immediate area to cause localized vaporization of any water droplets adjacent to the binding fibers. In addition, the heat of the binding fibers, during application of the electromagnetic field, may cause water droplets to be driven away from the hot binding fibers thereby allowing the finding fibers to melt and act as an adhesive to bind together adjacent reinforcing fibers. When the electromagnetic field is removed, the water droplets in the vicinity tend to return to their original location due to capillary action thereby quenching the hot binding fibers to cool and solidify them. Accordingly, the electromagnetic field need be applied only for a limited period of time in order to transform the wet, unmanageable raw preform into an easily handled unit characterized by a rigid structure in which substantially all of the reinforcing fibers are locked into place.

Once the reinforcing fibers of preform 36 have been bound together, preform 36 may be removed from contoured screen 16 by any suitable method. An exemplary preform made in accordance with the teachings of the present invention is illustrated in FIG. 4. In practice of the invention, contoured screen 16 would be suitably coated with Teflon ® or other antisticking compound so as to prevent sticking of preform 36 to contoured screen 16 thereby improving the removal process. The removed preform then can be subjected to a drying process to remove residual water from the preform. This can be accomplished in a variety of manners such as forced air convection drying and other suitable methods which would be compatible with the teachings of the present invention. Once preform 36 is dried, a fiber reinforced part is created by placing the preform in a mold and injecting resin into the mold. The resin impregnates the fibers of the preform thereby forming the desired structure.

The present invention provides a simple efficient method and apparatus for binding the fibers of a fiber reinforced plastic preform and further provides for a unique fiber construction for use with the present invention. It should be appreciated by those skilled in the art that modifications can be made without departing from the true spirit or fair scope of the present invention. The present invention will therefore be understood as susceptible to modification, alteration or variation by those skilled in the art without deviating from the scope of the invention as defined by the following claims.

What is claimed is:

1. A method for binding fibers in a fiber reinforced plastic preform comprising:
    (a) creating a preform from a mixture of reinforcing fibers and binding fibers having a matrix material and a filler material with ferromagnetic properties which are meltable in response to a high frequency electromagnetic field to thereby bind the reinforcing fibers together, and
    (b) exposing the preform to an electromagnetic field to thereby melt the binding fibers and bind the reinforcing fibers of the preform.

2. The method of claim 1 wherein the binding fibers are a plurality of thermoplastic fibers having a matrix of thermoplastic material and a dispersion of ferromagnetic filler material, with the method further comprising:
    dispersing the binding fibers evenly amongst the reinforcing fibers of the preform.

3. A method for binding fibers in a fiber reinforced plastic preform comprising:
    (a) placing a screen shaped to a preformed configuration near the bottom of a tank filled with a liquid;
    (b) adding reinforcing fibers to the liquid to create a slurry;
    (c) adding meltable binding fibers responsive to a high frequency electromagnetic field tot he slurry;
    (d) raising the screen to the top of the tank causing the reinforcing and binding fibers to be deposited on the screen thereby creating a preform;
    (e) melting the binding fibers by subjecting the preform to a high frequency electromagnetic field thereby binding the reinforcing fibers together into a more easily handled unit; and
    (f) removing the preform unit from the screen.

4. The method of claim 3 wherein the frequency of the high frequency electromagnetic field in step (e) is between 2 KHz and 2 MHz.

5. The method of claim 3 further comprising the step of removing the high frequency electromagnetic field within less than about 15 seconds.

6. The method of claim 3 wherein the meltable binding fibers comprise a combination of at least one thermoplastic and at least one ferromagnetic material.

7. The method of claim 6 wherein the ferromagnetic material comprises 5 percent to 20 percent by weight of the total weight of the meltable binding fiber.

8. The method of claim 7 wherein the ferromagnetic material comprises iron oxide particles approximately 0.5–5 microns in diameter and the thermoplastic material comprises thermoplastic polyester.

9. The method of claim 8 wherein the meltable binding fibers are 25–50 microns in diameter and approximately 0.25–1.25 inches in length.

10. The method of claim 8 wherein the reinforcing fiber comprises bundles of glass filaments approximately 2.5–25 microns in diameter and one half to six inches in length.

11. The method of claim 10 wherein the meltable binding fibers comprise approximately 3–10 percent by weight of the total weight of fibers added tot he slurry.

12. The method of claim 3 which further comprises the step of compressing the fibers against the screen wile subjecting the preform to the high frequency electromagnetic field.

13. The method of claim 3, which further comprises providing a mask having a substantially planar surface and an aperture formed therein to receive the screen, securing the screen to the mask, and raising the mask and screen tot he top of the tank.

14. The method of claim 3 which further comprises the steps of:
    (g) placing the preform in a mold;
    (h) injecting resin into the mold to impregnate the fibers in the preform to thereby form the structure; and
    (i) removing the structure from the mold.

* * * * *